No. 645,618. Patented Mar. 20, 1900.
J. R. CARTER.
CONNECTING DEVICE.
(Application filed Jan. 19, 1899.)
(No Model.) 2 Sheets—Sheet 1.
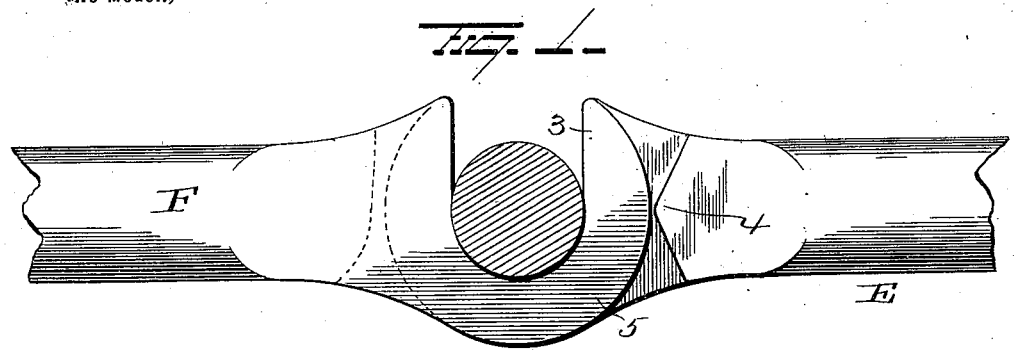
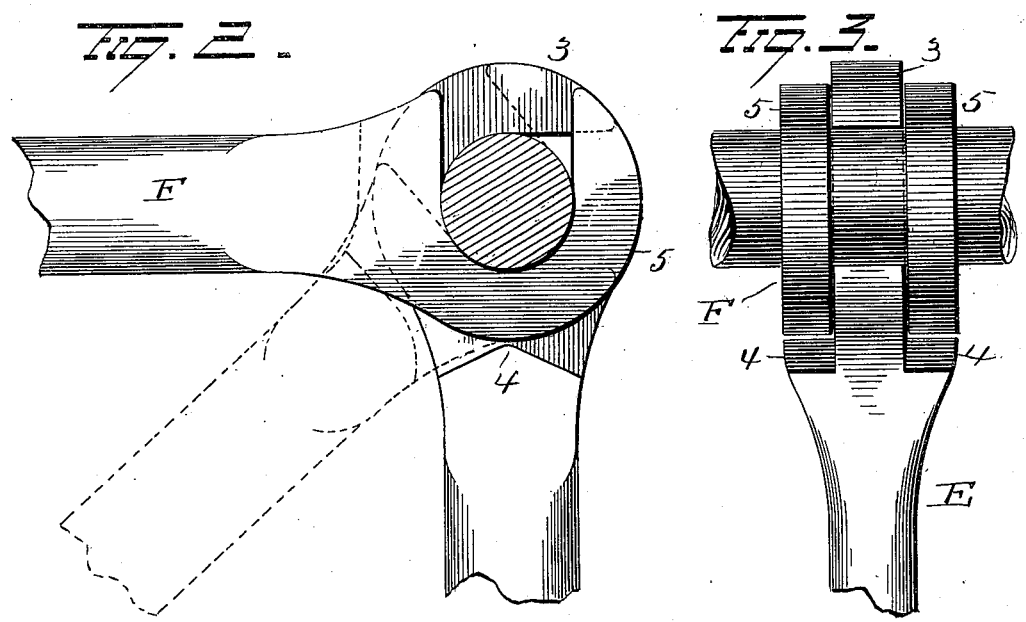
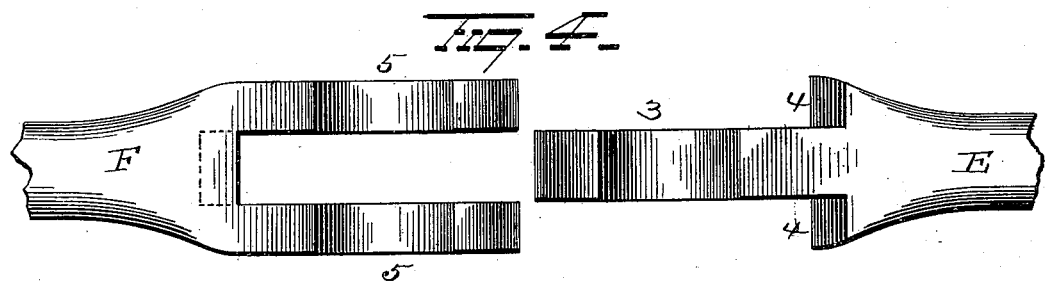
WITNESSES
E. D. Nottingham
G. F. Downing
INVENTOR
J. R. Carter
By H. A. Seymour
Attorney

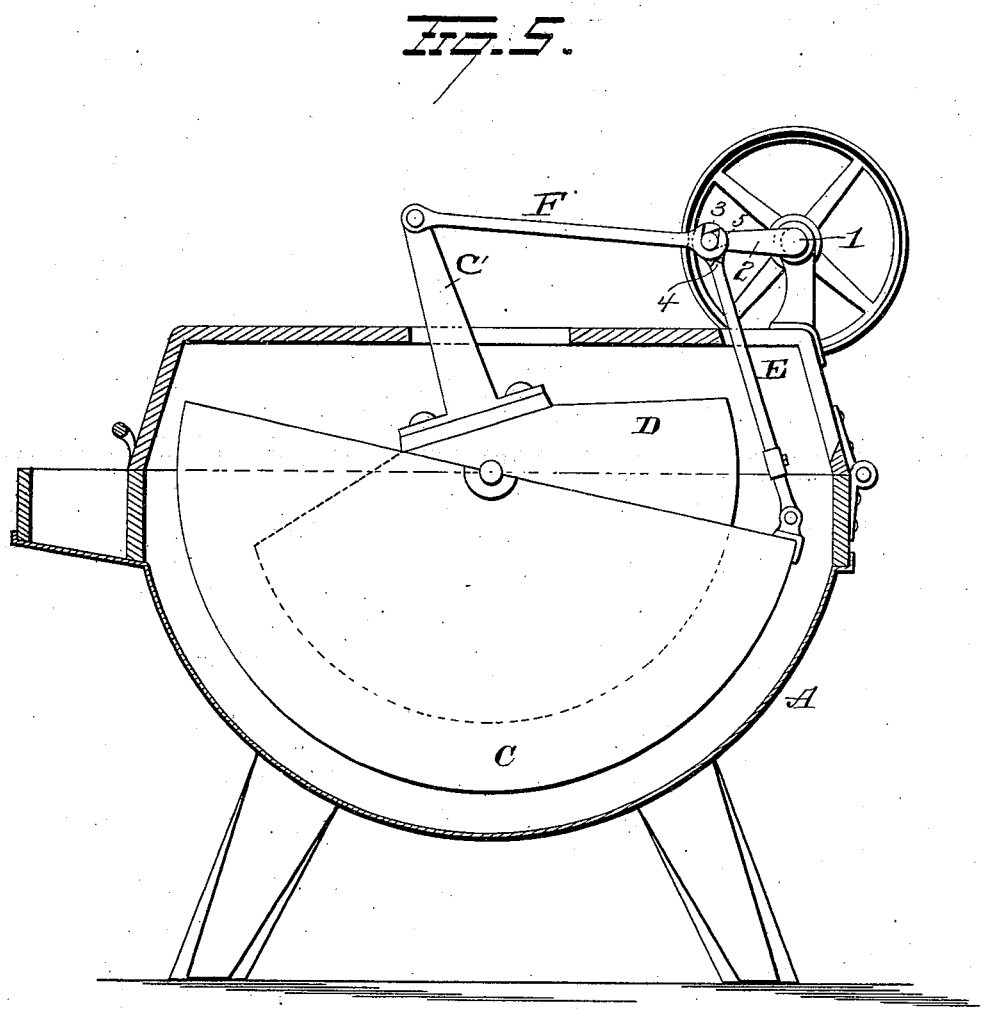

UNITED STATES PATENT OFFICE.

JOHN R. CARTER, OF CINCINNATI, OHIO.

CONNECTING DEVICE.

SPECIFICATION forming part of Letters Patent No. 645,618, dated March 20, 1900.

Application filed January 19, 1899. Serial No. 702,654. (No model.)

*To all whom it may concern:*

Be it known that I, JOHN R. CARTER, of Cincinnati, in the county of Hamilton and State of Ohio, have invented certain new and useful Improvements in Connecting Devices; and I do hereby declare the following to be a full, clear, and exact description of the invention, such as will enable others skilled in the art to which it appertains to make and use the same.

My invention relates to an improvement in connecting devices, and more particularly to means for connecting parts to be driven with the driving means, one object of the invention being to provide simple means whereby to quickly and effectually connect a crank-shaft with two devices to be driven thereby.

A further object is to so construct arms or pitmen that they can be quickly and removably connected with a rotating part and be normally prevented from escape.

A further object is to provide means whereby two arms can be removably connected with a shaft and be disposed at an angle to each other without danger of escape from said shaft.

With these objects in view the invention consists in certain novel features of construction and combinations and arrangements of parts, as hereinafter set forth, and pointed out in the claims.

In the accompanying drawings, Figures 1, 2, 3, and 4 are enlarged views illustrating my improvements, and Fig. 5 is a view showing one application of my invention.

While my improvements are applicable to machinery of various kinds, I have, for the sake of convenience, shown them as applied to a washing-machine.

A represents the tub or receptacle of a washing-machine, and B the cover thereof. A lower rubber C is mounted to oscillate in the receptacle A and coöperates with an upper rubber D, also mounted to oscillate (in a reverse direction) in said receptacle. A crank-shaft 1 is mounted on the cover of the receptacle A and connected by a pitman E with the lower rubber C. Another pitman F is connected at one end with the crank-arm 2 of said shaft and at the other end with an arm C', projecting upwardly from the upper rubber. It is to the connection between these pitmen and the crank-shaft that my present invention has particular reference.

The arm or pitman E is provided at its end with a hook 3, adapted to be placed on the crank-arm of the shaft 1, and in rear of said hook the arm or pitman E is provided on one or both sides with a tooth or projection 4 to bear against the hook-shaped end of the other arm or pitman F and prevent the escape of the latter from the crank-shaft. The arm or pitman F is bifurcated to form two hooks 5 5 for the accommodation of the crank on the shaft, said hooks embracing the hook 3 on the arm or pitman E, which is disposed between them.

It will be observed that the hook-shaped ends of the arms or pitmen are interlocked with respect to each other and will be effectually prevented from lateral displacement on the shaft.

In connecting the pitmen with the shaft they will first be placed in line with each other, so that all the hooks will aline, as shown in Fig. 1, and be thus adapted to be placed on the shaft. The arm or pitman F will then be turned and made to assume an angle to the arm or pitman E, when both arms or pitmen will be effectually connected with the shaft without danger of escape therefrom during the rotation of the shaft.

The arms or pitmen are capable of a wide range of movement relatively to each other without danger of becoming detached from the shaft, and yet they can be readily and quickly removed and replaced, which is a feature of importance in packing and shipping machines of the character on which my improvements are adapted to be used.

My improvements may also be used for supporting a revoluble shaft, in which case the arms E F would be secured at their ends opposite the hooks to any suitable support.

Having fully described my invention, what I claim as new, and desire to secure by Letters Patent, is—

1. In a pitman-coupling, the combination with a shaft, of two arms or pitmen removably mounted at one end thereof, one arm or pitman having an open hook for the reception of the shaft and having shoulders at respective sides of the base of said hook, the other arm having a pair of open hooks mounted on the shaft and embracing the first-mentioned hook, said pair of hooks prevented from displacement by the shoulders on the arm having the single hook.

2. In a pitman-coupling, the combination with a shaft, of two arms or pitmen, one having a single open hook and the other having a pair of open hooks, the single hook disposed on the shaft with the open end up and the pair of hooks disposed on the shaft so as to embrace the single hook and V-shaped shoulders on the arm or pitman having the single hook, said shoulders located at the base of said single hook and adapted to receive said pair of hooks.

In testimony whereof I have signed this specification in the presence of two subscribing witnesses.

JOHN R. CARTER.

Witnesses:
R. S. FERGUSON,
S. G. NOTTINGHAM.